United States Patent [19]

Dey

[11] 4,057,679
[45] Nov. 8, 1977

[54] ORGANIC ELECTROLYTE BATTERIES

[75] Inventor: Arabinda N. Dey, Needham, Mass.

[73] Assignee: P. R. Mallory & Co. Inc., Indianapolis, Ind.

[21] Appl. No.: 646,108

[22] Filed: Jan. 2, 1976

Related U.S. Application Data

[62] Division of Ser. No. 503,821, Sept. 6, 1974, Pat. No. 3,945,852.

[51] Int. Cl.² .............................................. H01M 6/14
[52] U.S. Cl. .................................. 429/194; 429/219; 429/220; 429/221; 429/223; 429/225
[58] Field of Search ............ 136/65, 49, 135 R, 135 S, 136/6 LN, 100 R; 429/194, 197, 218, 219, 220, 221, 223, 225

[56] References Cited

U.S. PATENT DOCUMENTS

| | | | |
|---|---|---|---|
| 3,615,831 | 10/1971 | Ruben | 136/65 X |
| 3,658,592 | 4/1972 | Dey | 136/6 LN |
| 3,798,070 | 3/1974 | Ruben | 136/26 |
| 3,870,563 | 3/1975 | Ruben | 136/26 |
| 3,871,915 | 3/1975 | Brych | 136/6 LN |
| 3,880,728 | 4/1975 | Habermann et al. | 136/26 X |
| 3,947,289 | 3/1976 | Dey et al. | 136/6 LN |

Primary Examiner—Charles F. LeFevour
Attorney, Agent, or Firm—Ronald S. Cornell; Israel Nissenbaum; Charles W. Hoffmann

[57] ABSTRACT

Corrosion of the current collectors in cells utilizing vanadium oxides and chromates as cathode materials is prevented by the utilization of metals from Groups IVb, Vb, and VIb of the Periodic Table for fabricating the current collectors and leads in contact with the cathode materials. Ta, Ti, and Mo are preferred materials. Cells containing such structures are described as well as an intermediate protective structure.

5 Claims, 4 Drawing Figures

ORGANIC ELECTROLYTE BATTERIES

This is a division of application Ser. No. 503,821, filed Sept. 6, 1974, now U.S. Pat. No. 3,945,852, issued on Mar. 23, 1976.

FIELD OF THE INVENTION

This invention relates to high energy density organic electrolyte cells based upon light metal anodes and strongly oxidizing cathodes and more particularly to specifically useful structures and structural materials for cathodes utilizing vanadium oxides, and metal chromates or dichromates.

BACKGROUND OF THE INVENTION

The Li/$V_2O_5$ (Ser. No. 829,849, now abandoned) and Li/metal chromate (U.S. Pat. No. 3,658,592) organic electrolyte cells show excellent energy density and storability at ambient temperatures. However, at elevated temperatures (e.g. 55° C or higher) the cells exhibit corrosion of the nickel cathode current collector.

1. The Li/$V_2O_5$ organic electrolyte cells made according to the procedure described in Ser. No. 829,849, showed severe corrosion of the nickel current collector and the nickel tab to the degree that the tab became disconnected from the current collector after a storage of three months at 55° C. The corrosion was particularly severe at the point were the nickel tab was welded onto the expanded nickel current collector. This resulted in a dead cell due to the lack of electrical contact between the cathode terminal and the cathode current collector.

OBJECTS OF THE INVENTION a. To eliminate the problem of corrosion of cathode current collectors, and b. to improve the elevated temperature storability of organic electrolyte batteries.

THE INVENTION

I have discovered that it is possible to protect nickel current collector tabs for cathode assemblies to permit an extension of the corrosion resistant life of cathodes beyond the three month, 55° C storage, maximum life expectancy of unprotected nickel current collectors. My method for protecting the current collector tabs in the weld areas which are most prone to corrosion consists of heat sealing layers of polyolefinic polymer foils on both sides of the tab weld. The heat-sealed foils extend completely around the tab-weld area and thus prevent the access and contact of electrolyte and cathode active material to the corrosion-prone tab-weld area.

The details of this aspect of my invention are illustrated in the drawing wherein.

Figure 1:
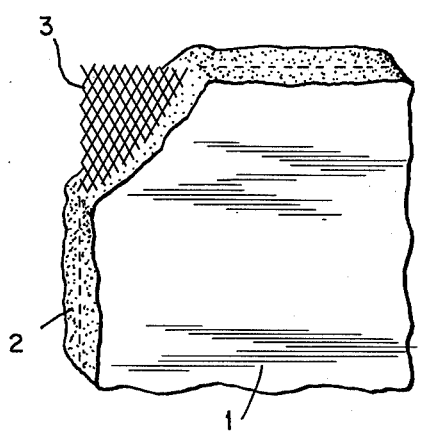
FIG. 1 shows the cathode assembly current collecting grid exposed in the area of the tab-weld.
Figure 2:
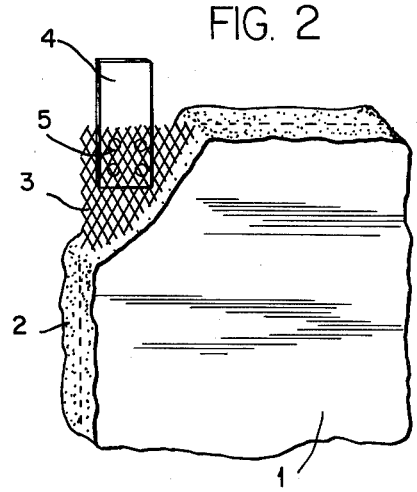
FIG. 2 shows the cathode assembly of FIG. 1 with the nickel tab welded in place to the current collector.
Figure 3:
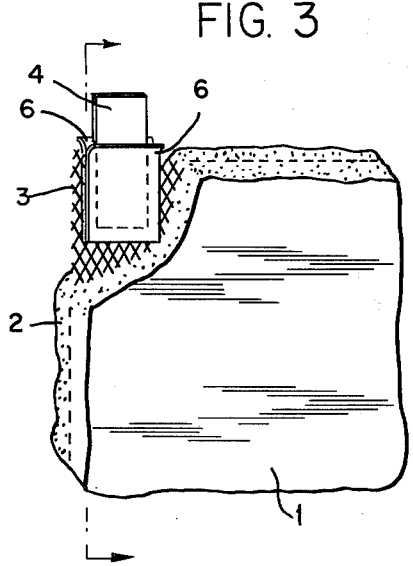
Figure 4:
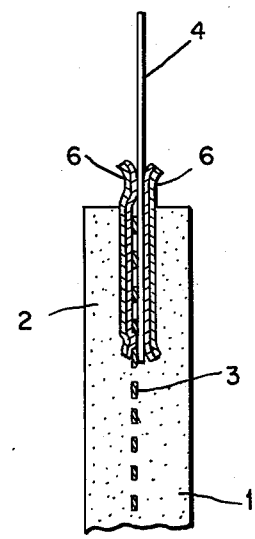

FIG. 3 shows the cathode tab-weld area of FIG. 2 protected by heat sealed polyethylene foils; and FIG. 4 is an enlarged view along line 4—4 of FIG. 3 showing the tab-weld area detailing the protection of the tab-weld area by polyethylene foils, heat sealed to the grid and embedded in the cathode active material. The procedure according to this aspect of the invention result in cells which survived the accelerated test of 3 months of storage with the electrolyte in contact with the cathode.

However, I have found that cathodes so constructed, showed tab and current collector corrosion after 6 months of storage at 55° C showing that the problem, while successfully ameliorated, still persisted.

My original solution to the corrosion problem was directed to the tab-weld area of the current collector assembly where the nickel current collector embedded in the cathode active material was fastened to the nickel tab leading from the cathode to the cell terminal connections. It had been noted that this was the focus of the corrosion when the cells were stored under accelerated aging conditions.

Welding conditions were varied, corrosive resistant alloys were used for the tabs, the welded areas as well as the current collectors and tabs were plated with protective, yet highly conductive, metals such as gold, but none of these expedients imparted sufficient corrosion protection to warrant the effort and expense. Then I discovered that by protecting the most corrosion-prone area, the tab-weld area, from access by the electrolyte by heat sealing electrolyte-proof foils around these critical areas, I could make cells that uniformly survived storage at 55° C for 3 months. Few of the previous expedients survived this test and none did so uniformly. The heat-sealed foils of this invention are foils of polyolefin polymer materials such as polyethylene and polypropylene.

Heat-sealable films of such materials are commercially available in various thicknesses ranging from 0.001 to 0.010 inch in thickness. I have found 0.002 inch thickness of polyethylene to be satisfactory and preferred as it is easily heat sealed around the tab-weld area. Such seals uniformly and adequately protect this critical corrosion prone area. The heat seals to the metal are easily fabricated with light, localized pressure by heated platens.

The current collectors of this aspect of this invention are fabricated by welding the nickel tabs 4, to Exmet grids 3. Then the areas of the weld 5 are overlain on each side of the weld by 2 mil polyethylene foils 6 and heat sealed by platens at the temperatures recommended for the specific brand of foils.

After this protection treatment, the cathode-active material 2 is applied to the current collector assembly by the techniques described in U.S. Pat. No. 3,658,592 and Ser. No. 829,849 to form cathode 1.

A variant method for applying the cathode active material 2 from the method described in U.S. Pat. No. 3,658,592 is that the chromate cathodes are dried at 60° C in a vacuum instead of at 300° C at atmospheric pressure as previously described.

I have further discovered that metals of Group IV*b*, V*b*, and VI*b* of the Periodic Table do not corrode when in contact with cathodic oxidizing agents such as vanadium pentoxide ($V_2O_5$), mercury (II) chromate ($HgCrO_4$), and silver chromate ($Ag_2CrO_4$), even at elevated temperatures.

Further, I have discovered that cathode collectors of tantalum (Ta), titanium (Ti), molybdenum (Mo), zirconium, (Zr), niobium (Nb), vanadium (V), chromium (Cr) and tungsten (W) or mixtures thereof in contact with such cathode-active materials are useful in the manufacture of cathodes for electrochemical cells based upon lithium or other light active metal anodes, organic electrolytes and such cathodes.

Such cells have extended shelf life when stored at 55° C beyond comparable cells manufactured with such conventional "anticorrosive" current collectors as nickel, silver, stainless steel, Inconel, gold-plated nickel, and polyolefin protected nickel.

It is a theory that the unique corrosion resistant properties of the metals of Group IV$b$, V$b$, and VI$b$ of the Periodic Table particularly Ta, Ti, and Mo which are preferred, are derived from their property of forming protective oxide films upon contact with these oxidants in the presence of the organic electrolytes. These oxide films, while protective of the underlying metal, possess a high degree of conductivity. Such cells show no increase in internal resistance when compared to cells using conventional current collectors.

DETAILS OF THE INVENTION

The $V_2O_5$, $HgCrO_4$ and $Ag_2CrO_4$ cathodes, made in a manner similar to that described in the application Ser. No. 829,849 and U.S. Pat. No. 3,658,592, on expanded-metal substrates such as Ni, Inconel, gold plated Ni, Ag, Ta, Ti, Mo, Zr, Nb, V, Cr, W, and stainless steel, were refluxed at 85° C in an electrolyte consisting of 1M $LiClO_4$ in an equivolume mixture of tetrahydrofuran and propylene carbonate, in order to accelerate the corrosion phenomenon. The reflux temperature was used to accelerate the corrosion test.

At the end of 233 hours of refluxing, the cathodes were examined. It was found that the expanded metal grids of Ta, Zr, Nb, V, Cr, W, Ti, and Mo did not show any signs of corrosion, whereas all the other metals were partially or completely corroded.

Of the protected non-corroding metal grids and tabs, tantalum, titanium and molydenum are preferred because of the ease of manufacture, lower cost and commercial availability.

The elevated temperature stability of the $Li/V_2O_5$, $Li/HgCrO_4$ and $Li/Ag_2CrO_4$ organic electrolyte cells were thus improved by the use of cathode grids and tabs made of metals such as Ta, Ti and Mo. The metals such as Zr, Nb, V, Cr, and W also improve the elevated temperature storability of the cells when used for cathode grids and tabs.

These cathode current collector materials may be used in the form of expanded metal sheets, wires, flat tabs, and cathode cups. The active material may be packed around the expanded metal, may have screens of wire of these metals included therein, or the sheets may be fashioned into terminal tabs or cathode cups as long as there is conductive contact between the cathode current collector and the cathode active material.

The current collectors, while particularly effective for vanadium oxide, and metal chromate and dichromate cathodes in organic electrolytes, may also be used for milder cathode active materials such as other metal oxides, halides, permanganates, arsenates, periodates, vanadates, persulfates, sulfites and mixtures thereof. The metal chromates include chromates of lead, iron, cobalt, nickel, thallium, bismuth and mixtures thereof and dichromates as well as chromates of silver, mercury and copper.

The organic electrolyte includes combination of electroylte salts compatible with the electrodes of the cells, and solvents including electrolyte salts such as perchlorate, hexaflurorphosphate, tetrafluoroborate, or hexafluoroarsenate salts of lithium or other light metal.

Solvents such as propylene carbonate, tetrahydrofuran, dimethoxy ethane, methyl formate, acetonitrile, dimethyl carbonate, dimethyl sulfoxide, dimethyl sulfite, dimethyl formamide, gammabutyrolactone, and N-nitrosodimethylamine and mixtures thereof are included.

Anodes for such cells include Li, Na, K, Ca, Mg, and Al.

What is claimed is:

1. A high energy density cell comprising an anode electrode of an active light metal selected from the group consisting of lithium, sodium, potassium, magnesium, calcium, beryllium, and aluminum; an electrolyte salt of said light metals; an organic solvent having dissolved therein said electrolyte salt; an active cathode material selected from the group consisting of metal chromates, dichromates, oxides, halides, permanganates, arsenates, periodates, vanadates, persulfates, sulfites and mixtures thereof; and a cathode current collector in direct contact with said active cathode material; said current collector being composed of a material selected from the group consisting of the metals of Groups IV$b$, V$b$, and VI$b$ of the Periodic Table and mixtures thereof.

2. A cell according to claim 1 wherein said electrolyte salt is selected from the group cnsisting of perchlorate, hexafluorophosphate, tetrafluoroborate, and hexafluoroarsenate salts of said light metals and mixtures thereof.

3. The cell according to claim 1 wherein said organic solvent is selected from the group consisting of tetrahydrofuran, dimethoxy ethane, methyl formate, acetonitrile, dimethyl carbonate, dimethyl sulfoxide, dimethyl sulfite, dimethyl formamide, gammabutyrolactone, N-nitrosodimethylamine and mixtures thereof.

4. A cell according to claim 1 wherein said active cathode comprises vanadium pentoxide, or a chromate or dichromate of silver, mercury, copper, lead, iron, cobalt, nickel, thallium, bismuth or a mixture thereof.

5. A cell according to claim 1 wherein said cathode current collector comprises titanium, tantalum, or molybdenum.

* * * * *